(12) United States Patent
Chen

(10) Patent No.: US 6,418,873 B1
(45) Date of Patent: Jul. 16, 2002

(54) BICYCLE WHEEL RIM WITH A WEAR-INDICATING PROJECTION

(75) Inventor: Chao-Ying Chen, Tainan Hsien (TW)

(73) Assignee: Alex Machine Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 09/717,875

(22) Filed: Nov. 21, 2000

(51) Int. Cl.$^7$ ............................................... G01D 21/00

(52) U.S. Cl. ........................................ 116/208; 116/200

(58) Field of Search ................................... 116/200, 201, 116/208; 301/95, 95.102, 6.7; 188/24.13

(56) References Cited

U.S. PATENT DOCUMENTS

| | | | | |
|---|---|---|---|---|
| 3,433,327 A | * | 3/1969 | Regis | 188/24.13 |
| 3,732,951 A | * | 5/1973 | Hata et al. | 188/24.13 |
| 4,074,742 A | * | 2/1978 | Chamblin | 152/154.2 |
| 6,065,812 A | * | 5/2000 | Lee | 188/24.13 |
| 6,120,105 A | * | 9/2000 | Chern | 301/95 |

FOREIGN PATENT DOCUMENTS

FR 2 342 859 * 9/1977

* cited by examiner

Primary Examiner—Diego Gutierrez
Assistant Examiner—Mirellys Jagan
(74) Attorney, Agent, or Firm—Webb Ziesenheim Logsdon Orkin & Hanson, P.C.

(57) ABSTRACT

A bicycle wheel rim includes an annular rim body having a central axis. The annular rim body includes annular left and right side walls spaced apart from each other. Each of the side walls has a radial inner edge proximate to the central axis, a radial outer edge distal to the central axis, and a lateral outer brake pad contacting surface opposite to the other one of the side walls. The annular rim body further includes an annular base wall interconnecting the radial inner edges of the left and right side walls. The brake pad contacting surface of each of the side walls is formed with a wear-indicating projection adapted to be in frictional contact with a brake pad. The wear-indicating projection is formed as a continuous annular projection that extends along a respective one of the side walls. The brake pad contacting surface gradually wears out during use of the bicycle wheel rim to eventually render the wear-indicating projection to wear off, thereby indicating that wearing of the bicycle wheel rim to a predetermined extent has occurred.

4 Claims, 2 Drawing Sheets

BICYCLE WHEEL RIM WITH A WEAR-INDICATING PROJECTION

BACKGROUND OF THE INVENTION

1. Field of the Invention

The present invention relates to a bicycle wheel rim, more particularly to a bicycle wheel rim formed with a wear-indicating projection to inform the user of the condition of the bicycle wheel rim that is in frequent frictional contact with a brake pad.

2. Description of the Related Art

A bicycle wheel rim generally includes an annular rim body with spaced left and right tire retaining walls, and a spoke-mounting wall interconnecting the tire retaining walls. A tire is to be installed between the tire retaining walls. Each of the tire retaining walls has a brake pad contacting surface opposite to the other one of the tire retaining walls for contacting a brake pad. After a period of use, the brake pads and the tire retaining walls of the bicycle wheel rim will tend to wear out. Although wearing of the tire retaining walls occurs at a rate much slower than that of the brake pads, wearing of the tire retaining walls should not be neglected since it affects the strength of the bicycle wheel rim. It is desirable that wearing of the tire retaining walls of the bicycle wheel rim be indicated to remind the user when replacement of the bicycle wheel rim has to be conducted.

FIG. 1 illustrates a known bicycle wheel rim 1 which is formed with a wear-indicating groove 13 in the brake pad contacting surface 121 of each of its tire retaining walls 12. During use of the bicycle wheel rim 1, the brake pad contacting surfaces 121 are frequently in frictional contact with brake pads (not shown) of a bicycle and are thus gradually worn out to eventually render the grooves 13 to be non-observable. At this time, the user can be notified that wearing of the bicycle wheel rim 1 to a predetermined extent has occurred, and that the bicycle wheel rim 1 has to be replaced with a new one to ensure safety of the user.

However, it is found that during use of the bicycle wheel rim 1, the tire retaining walls 12 are applied with a stress, which concentrates on portions that are formed with the wear-indicating grooves 13 to result in deformation or even breakage of the tire retaining walls 12. This condition is aggravated when the bicycle wheel rim has wider tire retaining walls, i.e., the width of the tire retaining walls measured between their radial inner edges and their radial outer edges, is relatively wide.

SUMMARY OF THE INVENTION

Therefore, the main object of the present invention is to provide a bicycle wheel rim formed with a wear-indicating projection for informing the user of the condition of the bicycle wheel rim, without the danger of undesired weakening of the bicycle wheel rim.

Accordingly, the bicycle wheel rim of this invention includes an annular rim body having a central axis. The annular rim body includes spaced left and right annular side walls adapted for retaining a bicycle tire therebetween. Each of the side walls has a radial inner edge proximate to the central axis, a radial outer edge distal to the central axis, and a lateral outer brake pad contacting surface opposite to the other one of the side walls. The annular rim body further includes an annular base wall interconnecting the radial inner edges of the left and right sidewalls. The brake pad contacting surface of each of the left and right side walls is formed with a wear-indicating projection adapted to be in frictional contact with a brakepad. The wear-indicating projection is formed as a continuous annular projection that extends along a respective one of the side walls. The brake pad contacting surface gradually wears out during use of the bicycle wheel rim to eventually render the wear-indicating projection to wear off, thereby indicating that wearing of the bicycle wheel rim to a predetermined extent has occurred.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
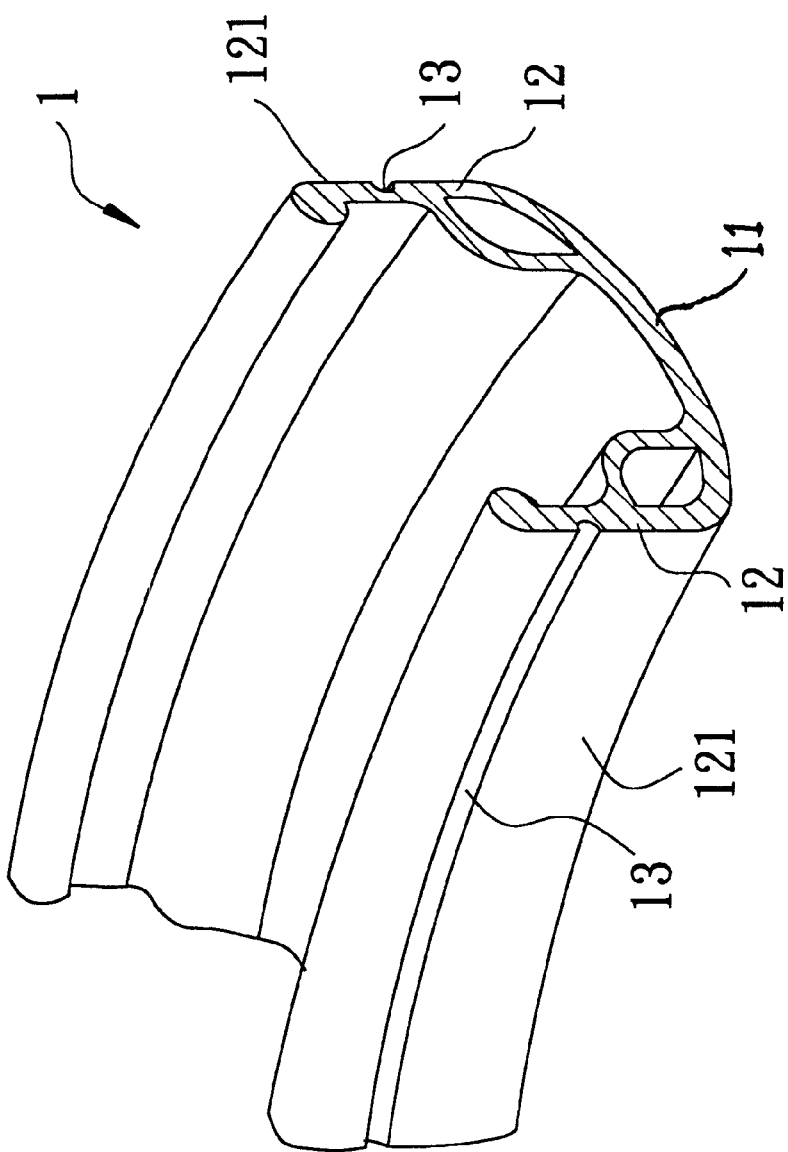
FIG. 1 is a fragmentary perspective view of a conventional bicycle wheel rim that is formed with a wear-indicating groove.
Figure 2:
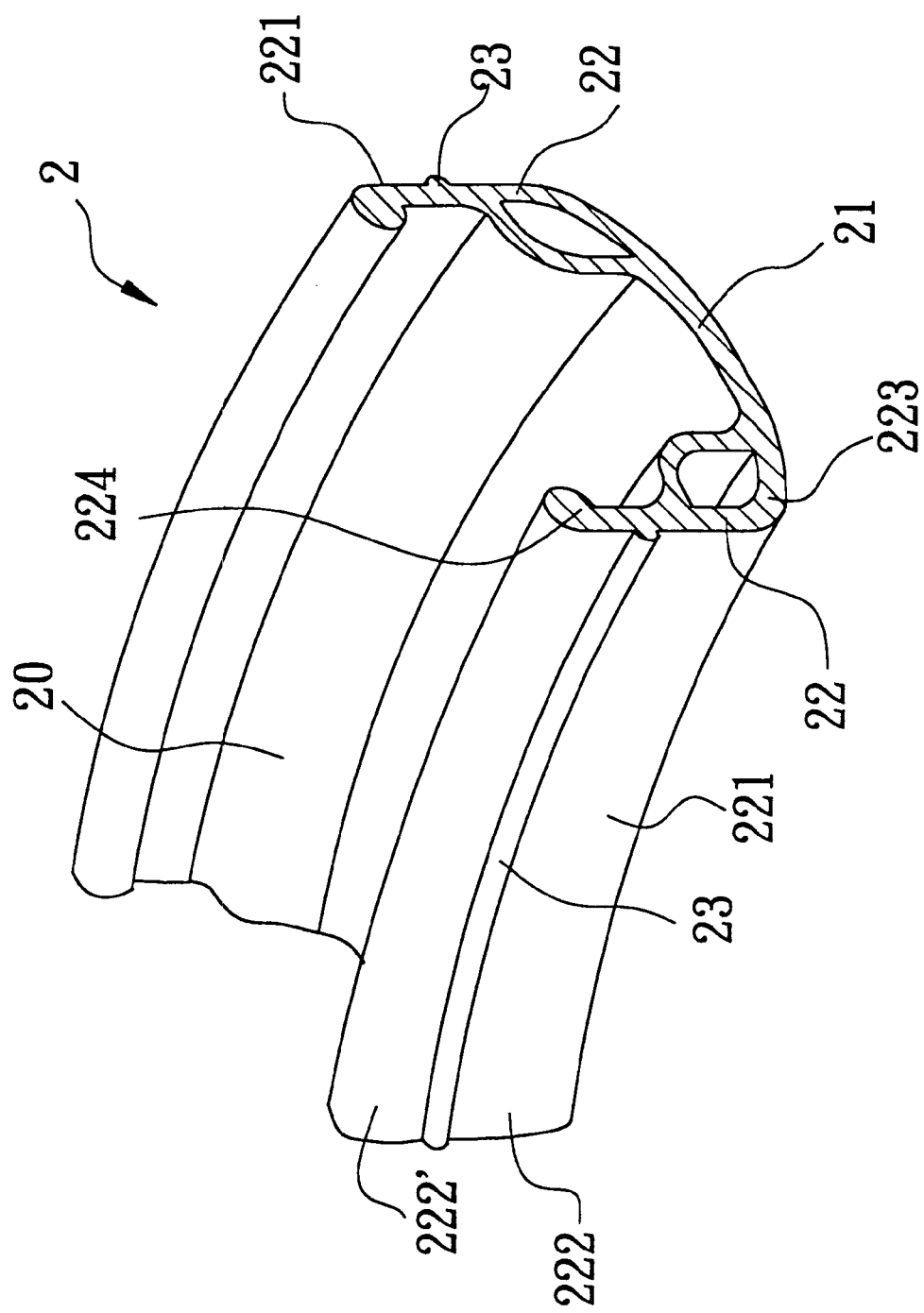
FIG. 2 is a fragmentary perspective view of a preferred embodiment of the bicycle wheel rim of the present invention.

Referring to FIG. 2, the bicycle wheel rim 2 of the present invention is shown to include an annular rim body, which is formed integrally from an aluminum alloy by extrusion. The rim body has spaced-apart left and right annular side walls 22, and an annular base wall 21 interconnecting the left and right annular side walls 22 and cooperating with the annular side walls 22 to confine a tire retaining space that is adapted for retaining a bicycle tire (not shown) therein.

Each of the side walls 22 has a radial inner edge 223 proximate to a central axis of the rim body, and a radial outer edge 224 distal to the central axis. The annular base wall 21 extends between and interconnects the radial inner edges 223 of the side walls 22. Each of the side walls 22 has a lateral outer brake pad contacting surface 221 opposite to the other one of the side walls 22. The brake pad contacting surface 221 is formed with a wear-indicating projection 23, which is in the form of a continuous annular projection that extends along the length of a respective one of the side walls 22 around the central axis of the rim body. The wear-indicating projection 23, which preferably has a convex cross-section, is formed at an intermediate portion of the respective side wall 22 between the radial inner and radial outer edges 223, 224, and is adapted to be in frictional contact with a brake pad (not shown).

The brake pad contacting surface 221 of each of the side walls 22 is formed with only one of the wear-indicating projection 23, and has flat first and second surface sections 222, 222' on opposite sides of the wear-indicating projection 23. The first surface section 222 extends between the radial inner edge 223 and the wear-indicating projection 23. The second surface section 222' extends between the radial outer edge 224 and the wear-indicating projection 23.

During use of the bicycle wheel rim 2, the brake pad contacting surfaces 221 are frequently in frictional contact with brake pads (not shown) of a bicycle and are thus gradually worn out. As the wear-indicating projection 23 projects relative to the flat first and second surface sections 222, 222', it will wear off at first and be flush with the first and second surface sections 222, 222' or even become non-observable. The user can thus be notified that wearing of the bicycle wheel rim 2 to a predetermined extent has occurred.

The wear-indicating projections 23 may be formed during extrusion. Since the wear-indicating projections 23 project from the brake pad contacting surfaces 221 of the side walls 22, the strength of the wheel rim 2 is not impaired. As such, deformation and breakage of the wheel rim 2 can be prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle wheel rim comprising an annular rim body having a central axis, said annular rim body including:

annular left and right side walls spaced-apart from each other and adapted for retaining a bicycle tire therebetween, each of said side walls having a radial inner edge proximate to the central axis, a radial outer edge distal to the central axis, and a lateral outer brake pad contacting surface; and an annular base wall interconnecting said radial inner edges of said left and right side walls;

said brake pad contacting surface of each of said left and right side walls being formed with only one wear-indicating projection adapted to be in frictional contact with a brake pad, said wear-indicating projection being formed as a continuous, annular projection that extends along a respective one of said side walls around the central axis, said brake pad contacting surface including flat first and second surface sections on opposite sides of said annular projection, said wear-indicating projection projecting relative to said first and second surface sections;

whereby, gradual wearing of said brake pad contacting surface during use of said bicycle wheel rim eventually causes said wear-indicating projection to wear off and to be flush with said first and second surface sections, thereby indicating that wearing of said bicycle wheel rim to a predetermined extent has occurred.

2. The bicycle wheel rim as claimed in claim 1, wherein said annular rim body is formed integrally from extruded aluminum.

3. The bicycle wheel rim as claimed in claim 1, wherein said brake pad contacting surface of each of said left and right side walls is formed with only one of said wear-indicating projections, each of said side walls further having an intermediate portion between said radial inner edge and said radial outer edge, said wear-indicating projection being formed in said intermediate portion of a respective one of said side walls, said first surface section extending between said radial inner edge and said wear-indicating projection, said second surface section extending between said radial outer edge and said wear-indicating projection.

4. The bicycle wheel rim as claimed in claim 1, wherein said wear-indicating projections each have a convex cross-section.

* * * * *